Patented Aug. 19, 1952

2,607,790

UNITED STATES PATENT OFFICE 2,607,790

METHOD OF PRODUCING ORGANIC MERCURIALS

Frank J. Sowa, Cranford, N. J.

No Drawing. Application May 15, 1946,
Serial No. 670,016

14 Claims. (Cl. 260—433)

My invention relates to methods for producing aromatic mercurials and to new chemical compounds produced by such methods as well as new compositions and uses for such compounds.

It is well known that many aromatic mercurials have valuable fungicidal and bactericidal properties and are useful for other purposes. Most of those compounds in common use today have the general formula R—Hg—X in which R is a group containing an aromatic nucleus having mercury attached to a carbon atom of the ring, and X is an anion. However, many aromatic mercurials having other formulas are valuable fungicides or have antiseptic or germicidal properties and can be produced in accordance with my invention.

Various methods have been employed heretofore for producing aromatic mercury compounds having the general formula R—Hg—X, but they have in almost every case involved the formation of an acetate compound by reactions between mercury oxide and acetic acid or between mercuric acetate and aromatic compounds. Some aromatic mercurials have also been produced by thermal decomposition reactions. However, such methods have been prolonged and difficult to control whereas phenylmercury acetate and similar compounds are expensive and many compounds which contain a substituted phenyl group cannot be produced from phenylmercury acetate or by other methods of the prior art. Moreover, many of these compounds have corrosive properties or are irritating to the skin and therefore cannot be handled readily or without danger.

In accordance with my invention novel methods of producing aromatic mercurials are provided wherein direct reaction takes place between mercuric sulfate and aromatic compounds in the presence of sulfuric acid. The reactions are carried out readily and frequently take place at relatively low temperatures so that they can be easily controlled and do not require special or expensive equipment for producing the products. Moreover, the cost of the materials employed and the time and cost of conducting the reactions render the process relatively economical. Furthermore, many new aromatic mercury compounds can be produced in accordance with the present invention and compounds which do not produce irritation or inflammation in contact with the skin are readily manufactured.

One of the objects of my invention is to reduce the cost of producing aromatic mercurials.

Another object of my invention is to produce new aromatic mercurials.

A further object of my invention is to provide novel and economical methods adapted for use in producing a wide variety of aromatic mercurials.

A specific object of my invention is to produce aromatic mercurials by reaction between aromatic compounds and mercuric sulfate in the presence of sulfuric acid.

These and other objects and features of my invention will appear from the following description thereof in which reference is made to specific and preferred methods of procedure and compositions for the purpose of indicating the nature of my invention, but without intending to limit the scope of my invention.

In carrying out reactions embodying my invention a solution of mercuric sulfate in sulfuric acid is employed. For most economical procedure mercury is dissolved in sulfuric acid to produce a solution containing mercuric sulfate dissolved in sulfuric acid. However, mercuric oxide (HgO) or mercuric sulfate ($HgSO_4$) may be dissolved in sulfuric acid to produce solutions containing mercuric sulfate and sulfuric acid adapted for use in accordance with my invention.

Typical solutions of this character have been produced as follows:

*Example I.*—80 grams of mercury and 160 grams of concentrated sulfuric acid were boiled for one hour and a half with vigorous evolution of sulfur dioxide. The solution was then diluted with 1000 cc. of water at which time it turned slightly yellow. A small amount of sulfuric acid was added to produce a clear solution and the solution was then filtered. About two grams of undissolved white material, presumably mercurous sulfate, was then filtered off leaving a yellow colored solution suitable for use in conducting further reactions in accordance with my invention. The reactions which take place require the expenditure of one mol of sulfuric acid to convert the mercury into mercuric oxide with the release of sulfur dioxide. A second mol of the sulfuric acid is expended in converting the mercuric oxide to mercuric sulfate. The final reagent therefore contains approximately two mols of free sulfuric acid for each mol of mercuric sulfate in the solution.

*Example II.*—4 moles of technical concentrated sulfuric acid were added to 1 mole of mercuric oxide and the mixture heated until all of the solid was white. The mixture was then added to 1500 cc. of water whereupon substantially all of the solid dissolved producing a pale yellow solution. The solution was filtered through diatomaceous earth and used in reactions with aromatic compounds as hereafter described. One mol of sulfuric acid is expended in converting the mercuric oxide to mercuric sulfate so that the resulting reagent contains three mols of free sulfuric acid for each mol of mercuric sulfate in the solution.

A solution adapted for use in accordance with my invention also may be produced by dissolving one mole of mercuric sulfate in four moles of concentrated sulfuric acid and diluting the solution with 1500 cc. of water.

I have discovered that solutions of this character react readily with aromatic compounds to produce aromatic mercurials. In some instances the reaction mixture is heated or even refluxed whereas in other cases the reaction takes place substantially at room temperature. The products obtained in many cases have the general formula R—Hg—SO$_4$H in which R represents a group containing an aromatic nucleus which may or may not be substituted and which has the mercury attached to a carbon atom of the ring. However, other salts or compounds can be produced by replacement of the sulfate radical by hydroxyl, acetate, lactate, nitrate, chloride or other anions. This is usually accomplished by neutralizing the excess sulfuric acid employed in the reaction with sodium hydroxide to produce the corresponding hydroxide. The desired salts can then be produced from the hydroxide by treatment with an acid or in any conventional or preferred manner.

Other compounds produced in accordance with my invention appear to be mercury containing inner-anhydrides of aromatic acids whereas various polymercurials also can be produced by the methods of my invention.

The aromatic compounds used in carrying out the reactions are preferably derivatives of benzene or its homologues, or oxygen containing derivatives of benzene such as carboxylic compounds, ethers, phenols and esters. Typical of these compounds are hydrocarbons such as benzene and toluene; substituted hydrocarbons such as chlorbenzene, aniline and dimethylaniline; carboxylic acids such as benzoic and salicylic acids; phenols and cresols; aromatic ethers such as anisole and amyl phenyl ether; aromatic alcohols such as benzyl alcohol and oxides such as diphenyl oxide. It thus appears that substantially any aromatic compound can be used in conducting reactions embodying my invention and many new compounds not heretofore produced can be manufactured readily and economically thereby.

In order to indicate the nature of my invention more fully the following specific examples of reactions between the solutions of Examples I or II and various organic compounds are cited as representative of the many reactions which can be carried out and as typical of the compounds which may be produced and preferred procedure which may be employed in accordance with my invention.

*Example III.*—27.6 grams of salicyclic acid were dissolved in approximately 400 cc. of boiling water. 500 cc. of the mercuric sulfate-sulfuric acid solution of Example I were then added in small proportions while the mixture was maintained at its boiling point. The mixture was thoroughly shaken after each addition of the mercuric sulfate. Precipitation occurred rapidly yielding 73 grams of a white crystalline substance which is substantially insoluble in water, benzene, alcohol, ether and dilute acids but readily soluble in dilute caustic soda and aqueous solutions of triethanolamine and mixtures containing ammonium hydroxide and ammonium lactate. On heating the reaction product it was unchanged at 235° C. but turned pink as the temperature was increased and was a dark brown at 290° C.

In order to determine the composition and structure of this mercury derivative of salicyclic acid more fully, the product was treated with iodine dissolved in methyl alcohol and the resulting product was extracted and found to melt at 230° C. with slight decomposition. This is the known melting point of 4-iodo salicyclic acid (Chemical Abstracts 22:959). A sample of this iodo acid was further reacted with acetic anhydride and gave a product which melted sharply at 156–157° C. corresponding to the known melting point of 4-iodo aspirin (Chemical Abstracts 18:1657). It is therefore concluded that the product obtained by reaction between salicyclic acid and mercuric sulfate in the presence of sulfuric acid has the structural formula

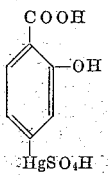

*Example IV.*—12.2 grams ($\frac{1}{10}$ mole) of benzoic acid were dissolved in slightly more than the minimum amount of boiling water necessary for solution. The mercuric sulfate solution of Example I was added slowly while refluxing the mixture. Precipitation occurred almost immediately, resulting in the formation of 25.1 grams of a white crystalline product. This compound decomposes at temperatures above about 305° C. without melting. It is substantially insoluble in water, alcohol, ether and benzene, but is readily soluble in sodium hydroxide and aqueous solutions of triethanolamine.

It is believed that this product is largely in the form of an inner-anhydride of the acid produced according to the equation

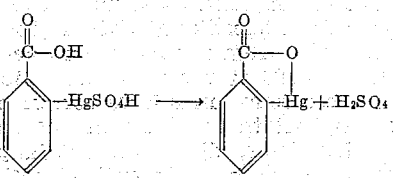

This is confirmed by quantitative analysis and is consistent with the reactions described in Helvetica Chemica Acta vol. 38, page 17 (1945). Furthermore, as pointed out in Example XII, the mercury is evidently present in the compound in a position ortho to the carboxyl group.

*Example V.*—350 cc. of the mercuric sulfate solution of Example I were added to 10.8 grams ($\frac{1}{10}$ mole) of anisole and the mixture shaken periodically while maintained at room temperature. In about 15 minutes precipitation began and continued for several hours, the mixture being shaken frequently. The resulting product was a white crystalline material which on heating begins to turn brown at about 170° C., but does not melt even at 310° C. This product was difficult to dry and when allowed to remain wet from the solution the crystals turn pink on standing in air. However, when washed with 95% ethyl alcohol or with benzene or when suspended in methanol and then washed they remained white indefinitely in the open air.

The composition and structural formula of the anisole-mercuric acid sulfate reaction product was determined by treatment with iodine in alcoholic solution, whereby a product melting at 66.5° C. was obtained corresponding to the melting point of 2,4,di-iodo-anisole (Beilstein vol. 6, page 210). It is therefore concluded that the product is a polymercurial having the structural formula

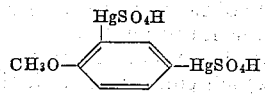

*Example VI.*—500 cc. of the mercuric sulfate solution of Example I were added to a solution of 18.8 grams of phenol in 300 cc. of water. The mixture was agitated and precipitation took place within about one-half hour while the reaction mixture was maintained at room temperature. Precipitation continued to take place over a period of several hours, yielding a white crystalline product which on heating to 200° C. begins to turn pink and is brown in color at 280° C. although no melting was observed. When treated with iodine the iodine compound of the reaction product was found to melt at 155° C. to 157° C. which corresponds to the known melting point of 2,4,6 iodo-phenol. It is therefore concluded that the reaction product produced in accordance with my invention has the structural formula

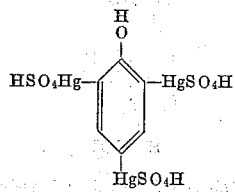

*Example VII.*—10.8 grams ($\frac{1}{10}$ mole) of benzyl alcohol were mixed with 250 cc. of the mercuric sulfate solution of Example II. The mixture was shaken frequently while maintained at room temperature. A precipitate was produced on standing overnight and consisted of a white crystalline product which is easily dried and flaky in character and which decomposes without melting at temperatures in the neighborhood of 300° C. The structural formula of this product has not been determined, but it is believed to be a benzyl alcohol mercury acid sulfate having a composition corresponding to the formula $$HOCH_2C_6H_4HgSO_4H$$

Other reaction products

*Example VIII.*—By employing methods similar to those of the foregoing examples, amyl phenyl ether mercury acid sulfate has been produced and found to be a white crystalline product which turns slightly yellow when heated to 140° C., but does not melt at temperatures up to 200° C.

*Example IX.*—Diphenyl oxide mercury acid sulfate produced by reactions between mercuric sulfate solutions and diphenyl oxide has been produced and is found to be a white crystalline product which decomposes at temperatures between 280 and 300° C. without melting. It is believed to be a polymercurial.

*Example X.*—The product produced by reactions between aniline and mercuric acid sulfate solutions is white in color but turns yellow when heated to 140° C. and is completely decomposed at 198° C. On iodination of the reaction product a compound melting at 186° C. to 187° C. is obtained which corresponds to the melting point of 2,4,6 iodo-aniline as given by Beilstein. It is therefore believed that the aniline reaction product has the structural formula

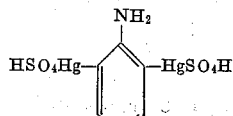

A white crystalline product also is produced by reactions between mercuric sulfate and dimethylaniline in the presence of sulfuric acid.

*Example XI.*—Products have also been obtained by reactions between the mercuric sulfate solutions of Examples I and II and benzene, toluene and chlorbenzene. These reactions require continued and vigorous agitation because the reactants are not miscible and intimate contact is not readily maintained. In each case the product obtained was a white crystalline substance which when heated turns dark or decomposes without melting. The composition of the benzene reaction product has not been definitely determined, but its melting point and reactions differ from those of phenylmercury sulfate produced by reactions between phenylmercury hydroxide and sulfuric acid. It is believed to be a polymercurial. The toluene and chlorbenzene reaction products also appear to be polymercurials.

In general the oxidation compounds of benzene and its derivatives react most readily with mercuric sulfate and those compounds containing the group —OR attached to a carbon atom of the ring, where R is hydrogen or an alkyl or aryl group, are formed at room temperatures.

The concentration of the mercuric sulfate-sulfuric acid solution also has some influence on the speed and optimum reaction conditions. Thus, when using 100 cc. of the solution of Example I diluted with 900 cc. of water to form 1 liter of the reaction solution it was found that the speed of the reaction was slower and some heating was desirable to produce the reaction products rapidly.

Other aromatic compounds

Products resulting from reactions between aromatic compounds and mercuric sulfate-sulfuric acid solutions are readily converted into other salts by treatment with sodium hydroxide, which produces the corresponding aromatic mercury hydroxide, followed by treatment with an acid to produce the desired salt.

*Example XII.*—The product of Example IV can be converted into the corresponding mercury chloride by the addition of potassium chloride to a solution of the product in sodium hydroxide. The chloride produced is a white crystalline material which is sintered and begins to turn brown at about 260°, but it is not fully melted at 310°. A similar product is produced by precipitation with hydrochloric acid from a sodium hydroxide solution of the product of Example IV.

In order to determine the composition and formula of the chloride, the compound was treated with iodine dissolved in boiling methanol, producing a reaction product which had a melting point of 161°-162° C. which corresponds to the known melting point of ortho iodo benzoic acid.

The compound is therefore believed to have the following structural formula

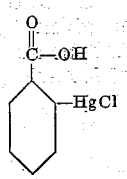

*Example XIII.*—15.8 grams of the salicylic acid reaction product of Example III were dissolved in dilute sodium hydroxide in which it is readily soluble and filtered through diatomaceous earth, treated with decolorizing charcoal and again filtered through diatomaceous earth. 25 grams of ammonium chloride dissolved in water was added to the amber colored solution causing some precipitation. When the solution was made acid with concentrated hydrochloric acid, white crystals precipitated and the solution turned slightly purple in color. The precipitate when filtered and dried decomposed without melting. It started to turn color at about 225° C. and was dark brown at 260° C.

*Example XIV.*—The benzoic acid reaction product of Example IV can be converted into the corresponding acetate by the addition of glacial acetic acid to a solution of the reaction product in sodium hydroxide, using sufficient acetic acid to render the solution strongly acid. The acetate is a white crystalline product which beings to decompose at about 290° C. without melting.

From the wide variety of aromatic compounds which have been produced and tested, it will be apparent that my invention is adapted for use in producing a great variety of aromatic mercury compounds, many of which have not been produced heretofore. In view thereof it should be understood that the examples cited above are intended to be illustrative only and are not intended to limit the scope of my invention.

Products produced in accordance with my invention possess valuable fungicidal and bactericidal properties as indicated by the fact that each of the products described above produces a pronounced halo when applied to cultures of *Aspergillus niger* and *Staphylococcus aureus*, using the procedure of the Food and Drug Administration Ager Plate Test No. 198. They may be dissolved in various aqueous solvents for use in textile treating baths or for agricultural sprays or other purposes using methods set forth in my copending applications Serial Nos. 489,244; 500,449 now Patent Nos. 2,411,815 and 2,432,262, respectively and 518,475 now abandoned. In the alternative they may be used in a dry powered form or when mixed with diluents or other agents for many purposes such as seed disinfectants or the like as indicated for example by U. S. Patent No. 1,618,369. Products of the present invention also appear to be much less corrosive and irritating to the skin than phenylmercury compounds heretofore employed as fungicidal agents. Thus the products of Examples III and IV were each applied to the skin as a poultice which was maintained damp for two days without producing any inflammation or irritation whatever.

It is therefore evident that both the methods and the products of the present invention are of broad application and have many uses and may be varied in many respects without departing from the spirit and scope of my invention.

I claim:

1. The method of producing an aromatic mercury acid sulfate which comprises contacting an aromatic compound with an aqueous solution containing mercuric sulfate and sulfuric acid in the proportion of about one mole of mercuric sulfate for at least two moles of sulfuric acid present.

2. The method of producing an aromatic mercury acid sulfate which comprises contacting an aromatic compound with an aqueous solution containing mercuric sulfate and sulfuric acid in the proportion of about one mole of mercuric sulfate and at least two moles of sulfuric acid for each 1500 cc. of water in the solution.

3. The method of producing aromatic mercury acid sulfate which comprises contacting an oxygen containing derivative of benzene selected from the group consisting of aromatic acids, phenols, aromatic alcohols and aromatic ethers, with a solution containing about one mol of mercuric sulfate for not less than two mols of sulfuric acid present in the solution.

4. The method of producing an aromatic mercury acid sulfate which comprises contacting an aqueous solution containing about one mole of mercuric sulfate for each two mols of sulfuric acid with an aromatic compound containing a benzene ring to a carbon atom of which is attached a group represented by the radical —OR where R is selected from the group consisting of hydrogen, alkyl and aryl.

5. A composition of matter having the structural formula

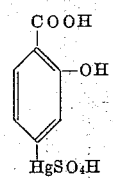

6. A composition of matter having the structural formula

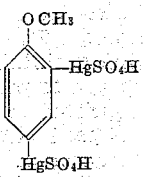

7. A composition of matter having the structural formula

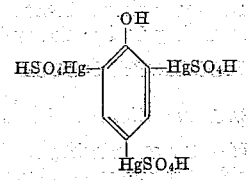

8. The method of producing silicyl mercury acid sulfate which comprises contacting an aqueous solution containing about one mole of mercuric sulfate for each two moles of sulfuric acid present with salicylic acid.

9. The method of producing benzoic mercury acide sulfate which comprises contacting an aqueous solution containing about one mole of mercuric sulfate for each two moles of sulfuric acid present wth benzoic acid.

10. The method of producing anisole mercury acid sulfate which comprises contacting an aqueous solution containing about one mole of mercuric sulfate for each two moles of sulfuric acid present with anisole.

11. The method of producing phenol mercury acid sulfate which comprises contacting an aqueous solution containing about one mole of mercuric sulfate for each two moles of sulfuric acid present with phenol.

12. The method of producing aniline mercury acid sulfate which comprises contacting an aqueous solution containing about one mole of mercuric sulfate for each two moles of sulfuric acid and present with aniline.

13. A composition of matter having the structural formula

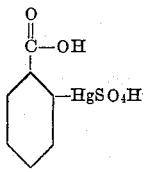

14. A compound having the composition represented by the formula $$HOCH_2C_6H_4HgSO_4H$$

and consisting of a white crystalline product which is flaky in character and which decomposes without melting at temperatures in the neighborhood of 300° C.

FRANK J. SOWA.

REFERENCES CITED

The following references are of record in the file of this patent:

UNITED STATES PATENTS

| Number | Name | Date |
|---|---|---|
| 1,525,078 | Kropp | Feb. 3, 1925 |
| 1,604,778 | Klages | Oct. 26, 1926 |
| 1,613,569 | Sagi | Jan. 4, 1927 |
| 1,618,095 | Klages | Feb. 15, 1927 |
| 1,748,331 | Englemann | Feb. 25, 1930 |
| 1,782,090 | Copley et al. | Nov. 18, 1930 |
| 1,787,630 | Kharasch | Jan. 6, 1931 |
| 1,862,896 | Kharasch | June 14, 1932 |
| 2,014,676 | Weed | Sept. 17, 1935 |
| 2,044,959 | Tisdale | June 23, 1936 |
| 2,353,312 | Kobe et al. | July 4, 1944 |
| 2,376,291 | Sowa | May 15, 1945 |
| 2,392,801 | Peterson | Jan. 8, 1946 |
| 2,543,733 | Sowa et al. | Feb. 27, 1951 |

FOREIGN PATENTS

| Number | Country | Date |
|---|---|---|
| 22,336 | Great Britain | May 23, 1907 |
| 242,669 | Great Britain | Feb. 11 1926 |
| 119,228 | Switzerland | Mar. 1, 1927 |

OTHER REFERENCES

Organic Compounds of Mercury Whitmore (1921), page 217.

Rupp et al., "Archiv der Pharmazie," vol. 265 (1927), pages 323–331.

"Chemical Abstracts," vol. 21 (1927), page 1867.

Pesci, "Gazzetta chimica italiana," vol. 28, pt. 2 (1898), page 466.

Goddard et al., "Textbook of Inorganic Chemistry," vol. XI, pt. I, (1928) pages 116–117.